United States Patent
Okamoto (10) Patent No.: US 9,191,541 B2
(45) Date of Patent: Nov. 17, 2015

(54) ILLUMINATION DEVICE AND IMAGE READING DEVICE

(71) Applicant: KYOCERA Document Solutions Inc., Osaka (JP)

(72) Inventor: Katsuhiko Okamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/579,802

(22) Filed: Dec. 22, 2014

(65) Prior Publication Data

US 2015/0189117 A1   Jul. 2, 2015

(30) Foreign Application Priority Data

Dec. 26, 2013 (JP) ................................ 2013-270009

(51) Int. Cl.
*H04N 1/04* (2006.01)
*H04N 1/028* (2006.01)
*F21V 8/00* (2006.01)

(52) U.S. Cl.
CPC .......... *H04N 1/02815* (2013.01); *G02B 6/0025* (2013.01)

(58) Field of Classification Search
CPC ............... F21V 7/06; F21V 7/08; F21V 7/09; F21V 7/10; F21V 7/22; H04N 1/02835; H04N 5/44; H04N 5/64; H04N 13/0404; H04N 13/0409; H04N 13/0415; H04N 13/0418; H04N 13/0452; H04N 1/02815; H04N 5/2254

USPC ......... 362/351, 355, 382, 516, 540, 612, 613, 362/615, 622, 625, 633, 634, 97.2; 358/474, 475, 509

See application file for complete search history.

(56) References Cited

U.S. PATENT DOCUMENTS

| | | | |
|---|---|---|---|
| 6,206,534 B1 * | 3/2001 | Jenkins et al. | 362/600 |
| 8,045,092 B2 * | 10/2011 | Jeong et al. | 349/62 |
| 2009/0073715 A1 * | 3/2009 | Saito et al. | 362/551 |
| 2009/0219586 A1 * | 9/2009 | Fujimoto et al. | 358/494 |
| 2010/0177362 A1 * | 7/2010 | Kim | 358/474 |
| 2011/0199652 A1 * | 8/2011 | Imoto et al. | 358/474 |
| 2011/0228353 A1 * | 9/2011 | Okamoto | 358/475 |
| 2012/0287484 A1 * | 11/2012 | Shimoda | 358/475 |

FOREIGN PATENT DOCUMENTS

JP          07-193675          7/1995

* cited by examiner

*Primary Examiner* — Negussie Worku (57) ABSTRACT

An illumination device includes a light source and a columnar light guide including: an incident surface provided at least one longitudinal end of the light guide and allowing light emitted from the light source to enter the light guide therethrough; a diffusing surface which forms one side surface of the light guide extending along an optical axis of the incident light entering the light guide through the incident surface and has a row of light diffusion patterns provided to diffuse the incident light; and an exit surface located opposite to the diffusing surface, extending along the optical axis, and allowing light diffused by the diffusing surface to exit the light guide therethrough. The light diffusion patterns have a prismatic shape rising toward the exit surface and are provided on the diffusing surface from $D^{1/2} \times 8$ or greater distance from the incident surface where D represents the diameter of the light guide.

5 Claims, 13 Drawing Sheets

ILLUMINATION DEVICE AND IMAGE READING DEVICE

INCORPORATION BY REFERENCE

This application claims priority to Japanese Patent Application No. 2013-270009 filed on Dec. 26, 2013, the entire contents of which are incorporated by reference herein.

BACKGROUND

The present disclosure relates to illumination devices with a light guide and image reading devices with a light guide and particularly relates to a technique in which light having entered the light guide through the incident surface thereof is diffused toward the exit surface of the light guide.

In image reading devices, such as a scanner, image reading is performed by applying light to an original document from which an image is to be read and receiving, at a light-receiving element, reflected light from the original document. In recent years, from the viewpoint of energy saving, downsizing, and so on, there emerge, as illumination devices for applying light to an original document from which an image is to be read, those employing a line light source in which a light source formed of a light-emitting element, such as an LED (light emitting diode), is combined with a light guide configured to guide light emitted from the light source. A plurality of light diffusion patterns are provided in a row on a surface (diffusing surface) of the light guide opposite to an exit surface thereof through which light exits the light guide. The light diffusion patterns are configured to diffuse light having entered the interior of the light guide to allow linear illumination light to exit the light guide toward the original document from which an image is to be read.

SUMMARY

A technique further modified from the above known technique is proposed as an aspect of the present disclosure.

An illumination device according to one aspect of the present disclosure includes a light source and a light guide.

The light guide is a columnar light guide including: an incident surface provided at least one of both longitudinal ends of the light guide and allowing light emitted from the light source to enter the light guide therethrough; a diffusing surface forming one side surface of the light guide extending in a direction of an optical axis of the light entering the light guide through the incident surface, the diffusing surface having a plurality of light diffusion patterns provided in a row to diffuse the light having entered the light guide through the incident surface; and an exit surface located opposite to the diffusing surface to extend in the direction of the optical axis and allowing the light diffused by the diffusing surface to exit the light guide therethrough.

The light diffusion patterns have a prismatic shape rising toward the exit surface and are provided in a row on the diffusing surface from $D^{1/2} \times 8$ or greater distance from the incident surface where D represents the diameter of the light guide.

An image reading device according to another aspect of the present disclosure includes the aforementioned illumination device and a light-receiving element.

The light-receiving element is configured to receive light reflected from an original document irradiated with light having exited the light guide through the exit surface.

DETAILED DESCRIPTION

Figure 1:
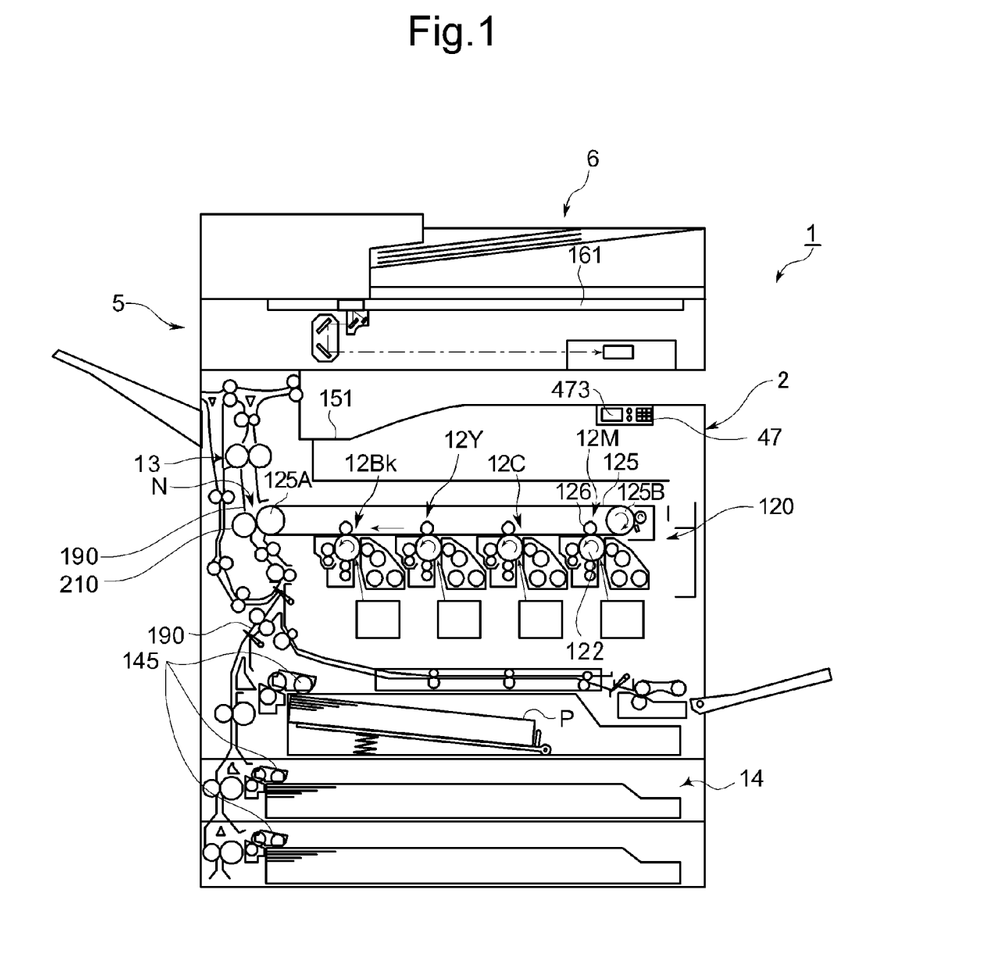
FIG. 1 is a front cross-sectional view showing the structure of an image forming apparatus equipped with an image reading device according to one embodiment of the present disclosure.

Hereinafter, a description will be given of an illumination device according to one embodiment of the present disclosure and an image reading device with the illumination device with reference to the drawings. FIG. 1 is a front cross-sectional view showing the structure of an image forming apparatus equipped with the image reading device according to the one embodiment of the present disclosure.

The image forming apparatus 1 according to the one embodiment of the present disclosure is a multifunction peripheral having multiple functions including, for example, a copy function, a print function, a scan function, and a facsimile function. The image forming apparatus 1 is made up so that an apparatus body 2 thereof includes an operating section 47, an image forming section 120, a fixing section 13, a paper feed section 14, a document feed section 6, an image reading device 5, and so on.

The operating section 47 is configured to receive operator's commands for various types of operations and processing executable by the image forming apparatus 1, such as a command to execute an image forming operation and a command to execute an image reading operation. The operating section 47 includes a display 473 configured to display operation guidance and so on for the operator.

In an image reading operation of the image forming apparatus 1, the image reading device 5 optically reads an image of an original document being fed from the document feed section 6 or an image of an original document placed on an original glass plate 161 to generate image data. The image data generated by the image reading device 5 is stored on an internal HDD, a network-connected computer or the like.

In an image forming operation of the image forming apparatus 1, the image forming section 120 forms a toner image on a recording paper sheet P serving as a recording medium fed from the paper feed section 14, based on image data generated by the image reading operation, image data received from a network-connected computer or a user terminal, such as a smartphone, or image data stored on the internal HDD. Each of image forming units 12M, 12C, 12Y, and 12Bk of the image forming section 120 includes a photosensitive drum 122, a developing device (not shown) operable to supply toner to the photosensitive drum 122, a toner cartridge (not shown) for holding toner, a charging device (not shown), an exposure device (not shown), and a primary transfer roller 126.

In the case of color printing, the image forming unit 12M for magenta, the image forming unit 12C for cyan, the image forming unit 12Y for yellow, and the image forming unit 12Bk for black of the image forming section 120 form respective toner images on their respective photosensitive drums 122 through charging, exposure, and developing processes based on respective images of respective different color components constituting the above image data and then allow their respective primary transfer rollers 126 to transfer the toner images to an intermediate transfer belt 125 mounted around a drive roller 125A and a driven roller 125B.

The outer peripheral surface of the intermediate transfer belt 125 is set to an image carrying surface to which a toner image is to be transferred. The intermediate transfer belt 125 is driven by the drive roller 125A while engaging against the peripheral surfaces of the photosensitive drums 122. The intermediate transfer belt 125 endlessly runs between the drive roller 125A and the driven roller 125B while synchronizing with the rotation of each photosensitive drum 122.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and the drive roller 125A with the intermediate transfer belt 125 in between, to a recording paper sheet P conveyed from the paper feed section 14 along a conveyance path 190. Thereafter, the fixing section 13 fixes the toner image on the recording paper sheet P by the application of heat and pressure. The recording paper sheet P on which the multicolor image has been fixed by the completion of the fixing treatment is discharged to a paper output tray 151.

The paper feed section 14 includes a plurality of paper feed cassettes. A control section (not shown) rotationally drives a pick-up roller 145 of the paper feed cassette containing recording paper sheets of the size designated by an operator's command and thereby allows the pick-up roller 145 to feed a recording paper sheet P contained in the paper feed cassette toward the nip N.

Figure 2:
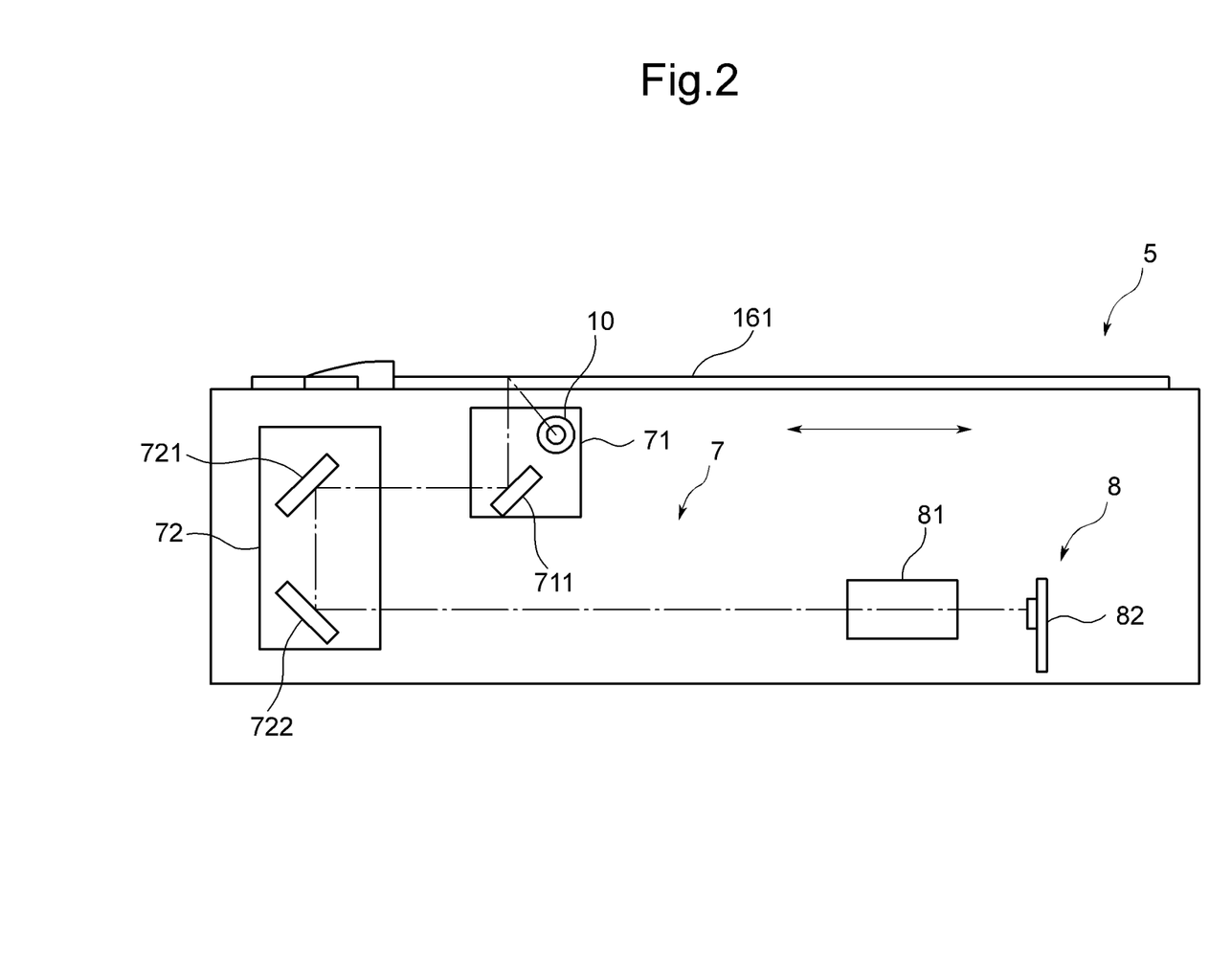
FIG. 2 is an internal side view showing a schematic structure of the image reading device according to the one embodiment of the present disclosure.

Next, a description will be given of the structure of the image reading device 5. FIG. 2 is an internal side view showing a schematic structure of the image reading device 5.

The image reading device 5, as shown in FIG. 2, includes an optical scanning device 7 and an image pickup unit 8.

The optical scanning device 7 includes a first optical system unit 71 and a second optical system unit 72. The first optical system unit 71 includes an illumination device 10 and a first mirror 711. The illumination device 10 is disposed facing and below the original glass plate 161 in order to illuminate a reading surface of an original document, i.e., illuminate above. The illumination device 10 includes a columnar light guide and a light source disposed at a longitudinal end of the light guide, as will hereinafter be described in detail. The illumination device 10 extends in a depth direction of FIG. 2. The direction of extension of the illumination device 10 is a main scanning direction during image reading.

The first mirror 711 is configured to receive light reflected on the image reading surface of the original document placed on the original glass plate 161 by the application of light of the illumination device 10 to the original document and horizontally redirect the reflected light. The first mirror 711 is disposed below the original glass plate 161. The illumination device 10 and the first mirror 711 are mounted to an unshown support member.

The second optical system unit 72 includes a second mirror 721 and a third mirror 722. The second mirror 721 is configured to receive light reflected by the first mirror 711 of the first optical system unit 71 and redirect the reflected light substantially vertically downward. The third mirror 722 is configured to substantially horizontally redirect the reflected light from the second mirror 721 to guide it toward the image pickup unit 8. The second mirror 721 and the third mirror 722 are mounted to an unshown support member.

The illumination device 10 and the mirrors provided in the first and second optical system units 71, 72 have an elongated shape extending in the main scanning direction and having a length substantially equal to the length of the original glass plate 161.

The image reading device 5 is internally provided with an unshown traveling rail for use to guide the movement of the optical scanning device 7 in the direction of the arrows in FIG. 2. Thus, the optical scanning device 7 equipped with the first and second optical system units 71, 72 can reciprocate in a sub-scanning direction (a direction perpendicular to the main scanning direction), i.e., in the direction of the arrows in FIG. 2, and in parallel with the surface of the original glass plate 161 to enable reading of image information of the entire reading surface of the original document placed on the original glass plate 161.

The image pickup unit 8 is fixed to a lower portion of the interior of the image reading device 5. The image pickup unit 8 includes an imaging lens 81 as an optical element and an image sensor 82 including a light-receiving element. The light reflected on the reading surface of the original document and then reflected by the third mirror 722 of the second optical system unit 72 enters the imaging lens 81. The imaging lens 81 forms an image of the reflected light on a surface of the image sensor 82 provided downstream in the optical path. The image sensor 82 is configured to generate a voltage indicating and according to the intensity of light received at the light-receiving element and output the voltage to the unshown control section. In this manner, using the image sensor 82, the image of the original document to be read can be read by the image reading device 5.

Figure 3:
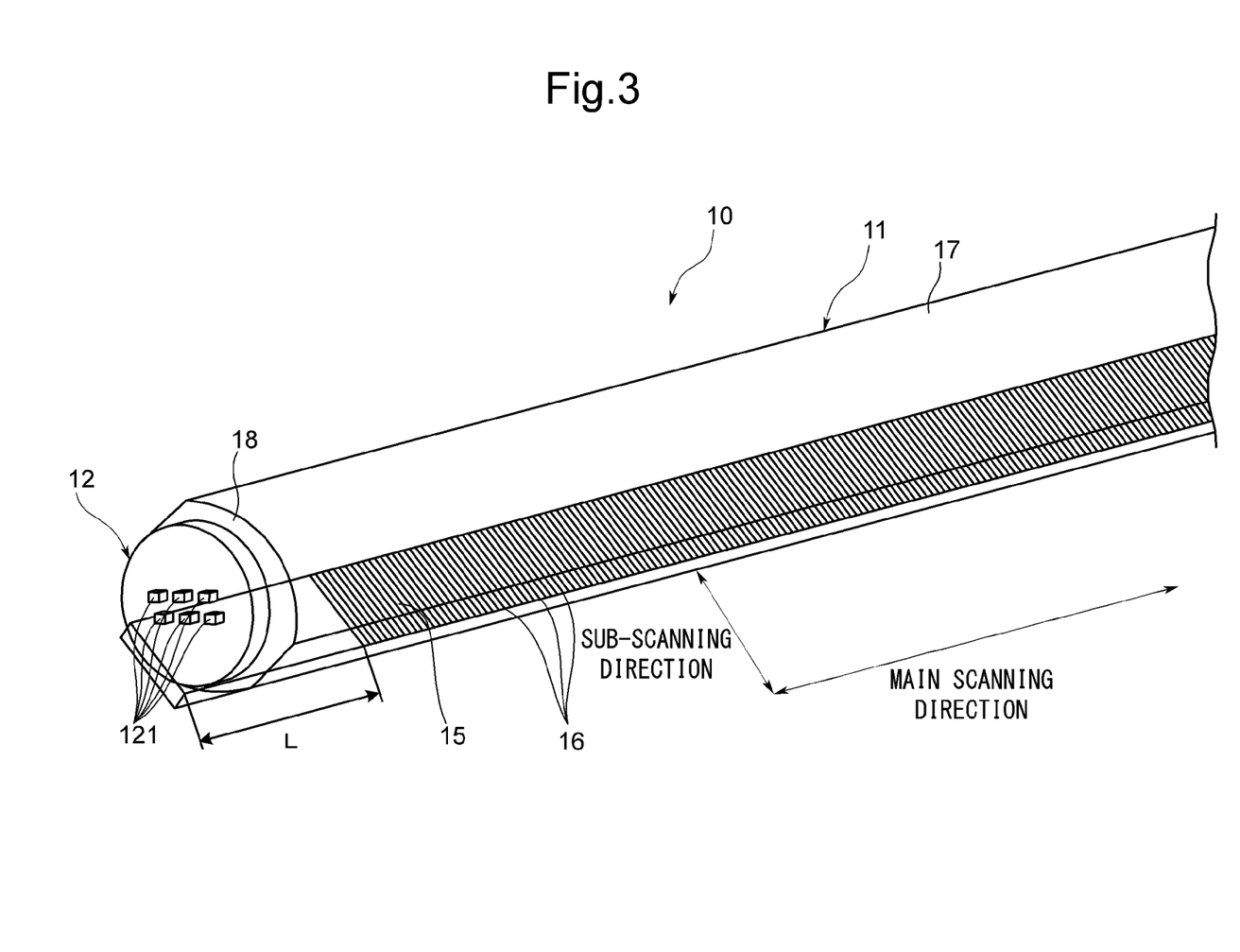
FIG. 3 is a perspective view showing an illumination device according to the one embodiment of the present disclosure.

Next, a description will be given of the illumination device 10 included in the image reading device 5. FIG. 3 is a perspective view showing the internal structure of the illumination device 10.

The illumination device 10 includes a light guide 11 and a light source 12.

The light guide 11 extends in a direction of the optical axis of light entering the interior of the light guide 11 from the light source 12. Since the light guide 11 extends in the main scanning direction as described previously, the direction of the optical axis coincides with the main scanning direction. The light guide 11 is formed of, for example, a resin-made light transmissive member and defined by an incident surface 18, an exit surface 17, and a diffusing surface 15. The light guide 11 is made by, for example, injection molding in which molten resin is injected into a mold.

The incident surface 18 is a surface of the light guide 11 allowing light emitted from the light source 12 to enter the light guide 11 therethrough and at least one of both the longitudinal end surfaces of the light guide 11 provides the incident surface 18. A description in this embodiment will be given of the case where only one of the longitudinal end surfaces is the incident surface 18. The light source 12 is mounted on the incident surface 18. Light emitted from the light source 12 enters the interior of the light guide 11 through the incident surface 18.

The exit surface 17 extends in the main scanning direction and forms one side surface of the light guide 11. In this embodiment, the exit surface 17 forms a top surface of the light guide 11. The light having entered the interior of the light guide 11 through the incident surface 18 is diffused by the diffusing surface 15 and the diffused light then exits the light guide 11 through the exit surface 17.

The diffusing surface 15 is located opposite to the exit surface 17 to extend in the sub-scanning direction. In this embodiment, the diffusing surface 15 forms a bottom surface of the light guide 11. The diffusing surface 15 has a plurality of light diffusion patterns 16 provided in a row to diffuse the incident light toward the exit surface 17. The diffusing surface 15 diffuses the incident light, which has entered the interior of the light guide 11 through the incident surface 18, toward the exit surface 17 via the light diffusion patterns 16. The light diffusion patterns 16 are formed integrally with the light guide 11 from the same material as the light guide 11.

The light source 12 is formed of, for example, an LED 121. The light source 12 is mounted on the exterior of the incident surface 18 of the light guide 11. In this embodiment, an example is shown where six LEDs 121 are provided as the light source 12. The direction of emission of light of the light source 12 toward the interior of the light guide 11 through the incident surface 18 (the direction of the optical axis) is a longitudinal direction of the light guide 11, i.e., the main scanning direction.

Hereinafter, a detailed description will be given of the light diffusion patterns 16 of the light guide 11 of the image reading device 5 according to the one embodiment of the present disclosure. Prior to this, light diffusion patterns of a light guide of a general image reading device will be described first.

The light diffusion patterns provided in a row on a diffusing surface of such a light guide generally have a prismatic shape rising toward the exit surface of the light guide. This is because a mold for making the light guide can be easily machined, resulting in reduced production costs for the light guide.

However, the light diffusion patterns having a prismatic shape cannot diffuse direct light from the light source, i.e., light incident directly from the light source on the light diffusion patterns, in the transverse direction of the light guide (corresponding to the sub-scanning direction of the image reading device). On the other hand, light incident on the light diffusion patterns following one or more total reflections on the outer periphery of the light guide after the emission from the light source (indirect light) can be diffused in the sub-scanning direction by the light diffusion patterns of prismatic shape, but the quantity of indirect light in a region of the light guide near the incident surface is small relative to the quantity of direct light in the same region. Therefore, the light diffusion patterns having a prismatic shape cannot diffuse a sufficient quantity of light in the sub-scanning direction in the region of the light guide near the incident surface. As a result, illumination distribution in the sub-scanning direction differs between the region of the light guide near the incident surface and a region thereof away from the incident surface.

In this situation, if there arises a movement of the image reading position during image reading operation or an event in which the original document floats above the surface of the original glass plate, the image reading position is displaced in the sub-scanning direction. Since, with the use of light diffusion patterns having a prismatic shape, illumination distribution in the sub-scanning direction differs between the region of the light guide near the incident surface and the region thereof away from the incident surface, a displacement of the image reading position in the sub-scanning direction may cause the read density of the image to vary in the main scanning direction. It is conceivable to reduce the probability of occurrence of read density variations of an image by providing the image reading position on the original glass plate at some distance from the incident surface of the light guide. However, this is unfavorable in view of energy saving because light diffused by light diffusion patterns near the incident surface of the light guide and exiting the light guide through the exit surface is wasted, so that the utilization efficiency of optical energy emitted from the light source becomes low.

Alternatively, if the light diffusion patterns in a row on the diffusing surface of the light guide are formed to have an oval shape rising toward the exit surface of the light guide, direct light can be diffused in the sub-scanning direction and the aforementioned difference in illumination distribution in the sub-scanning direction between longitudinally different regions of the light guide can be reduced. However, in this case, the machining of a mold for making the light guide becomes complicated, resulting in increased production costs for the light guide.

Figure 4:
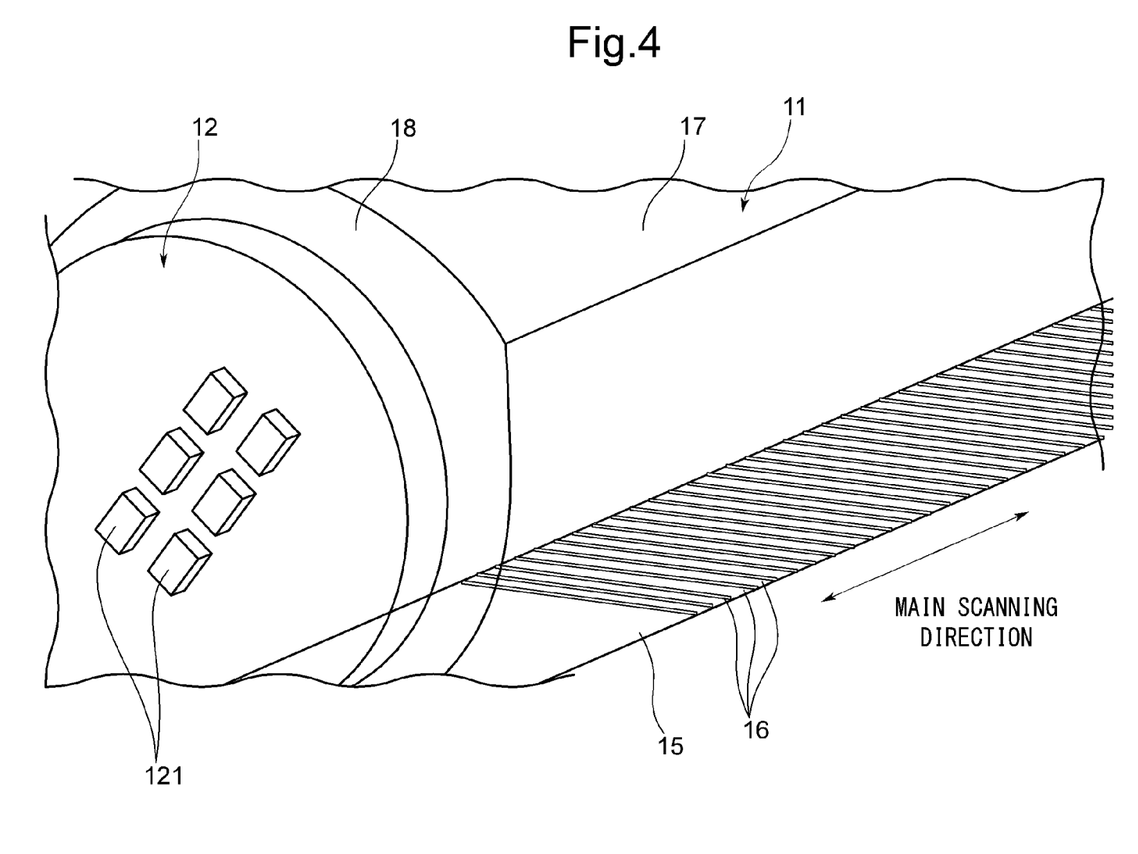
FIG. 4 is a perspective view showing light diffusion patterns provided in a row on a diffusing surface located inside of a light guide in the one embodiment of the present disclosure.
Figure 5:
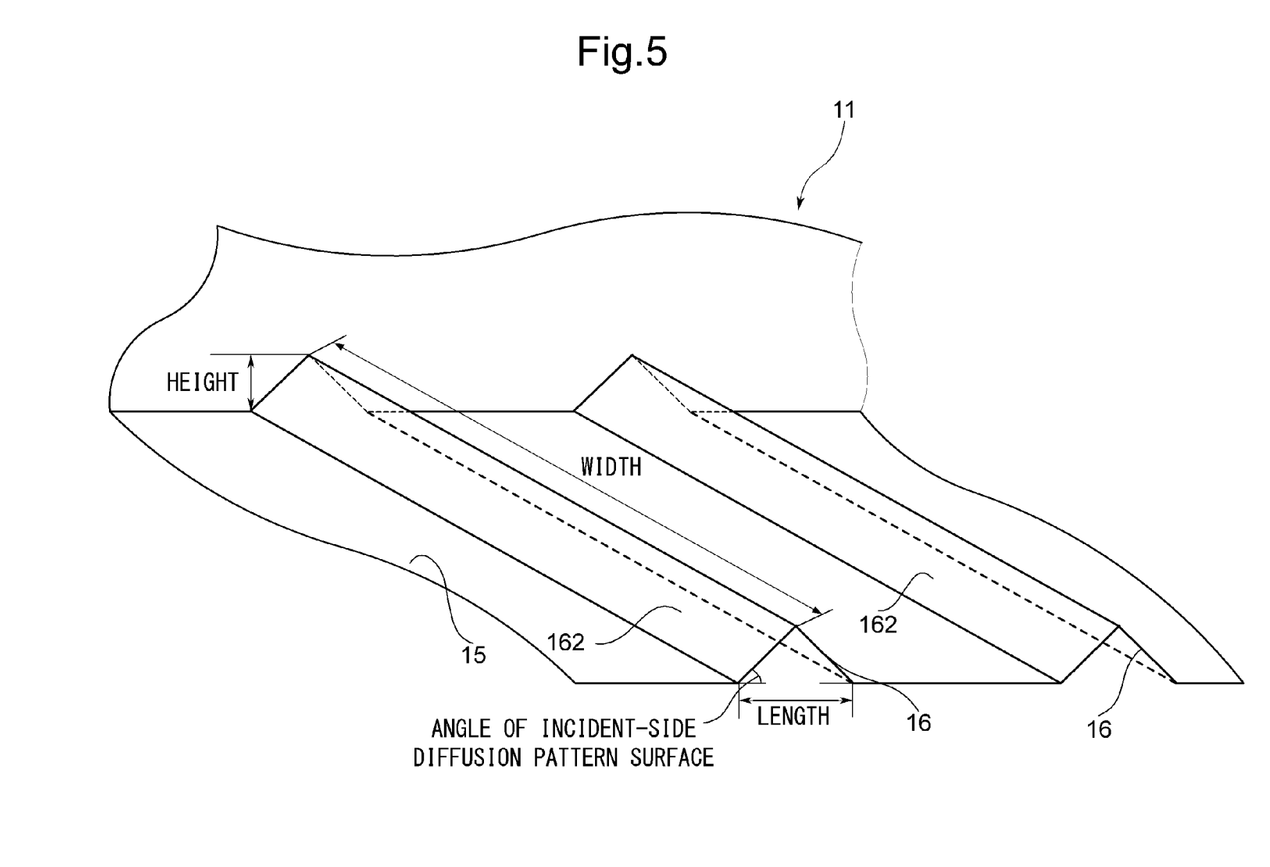
FIG. 5 is a perspective view showing in enlarged scale the light diffusion patterns provided in a row on the diffusing surface in the one embodiment of the present disclosure.
Figure 6:
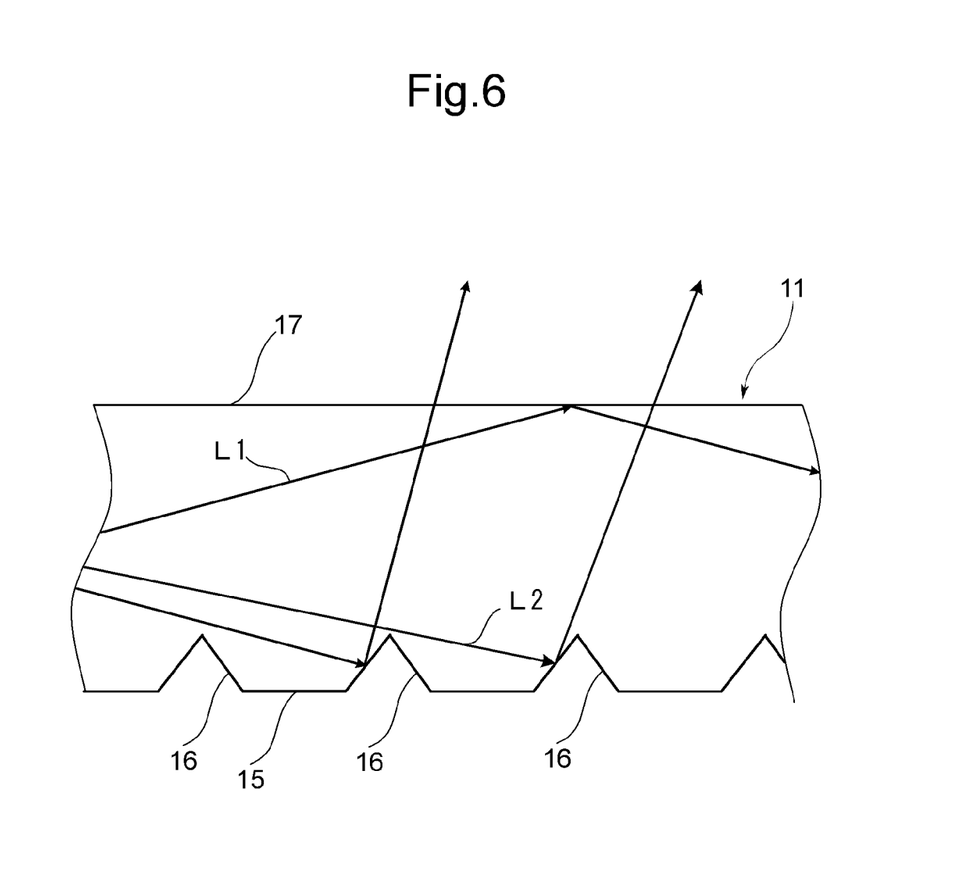
FIG. 6 is a view showing optical paths of light diffused by the light diffusion patterns provided in a row on the diffusing surface in the one embodiment of the present disclosure.

The inventor conducted intensive studies and reached the above notion. Furthermore, based on the above notion, the inventor devised light diffusion patterns 16 described below. FIG. 4 is a perspective view showing the light diffusion patterns 16 provided in a row on the diffusing surface 15 located inside of the light guide 15. FIG. 5 is a perspective view showing in enlarged scale the light diffusion patterns 16 provided on the diffusing surface 15. FIG. 6 is a view showing optical paths of light diffused by the light diffusion patterns 16 provided on the diffusing surface 15.

The light diffusion patterns 16 are shape patterns capable of diffusing light incident on themselves. The diffusing surface 15 has a row of a plurality of light diffusion patterns 16 formed in alignment with one another in the main scanning direction. The row of light diffusion patterns 16 are formed from a position on the diffusing surface 15 a distance L (see FIG. 3) from the incident surface 18 in the main scanning direction to an end of the diffusing surface 15 reaching the end surface of the light guide 11 opposite to the incident surface 18.

If the light guide 11 had no light diffusion pattern, light having entered the interior of the light guide 11 through the incident surface 18 would propagate through the light guide 11 in the main scanning direction while being totally reflected on the outer peripheral surface of the light guide 11 (see L1 in FIG. 6) and be finally guided to the end surface opposite to the incident surface 18 without leakage. In this case, the light from the light source 12 mounted on the incident surface 18 could not illuminate the original document. For this reason, the light diffusion patterns 16 are formed on the diffusing surface 15 opposite to the exit surface 17 to reflect the incident light in the sub-scanning direction.

As shown in FIG. 5, each light diffusion pattern 16 has a prismatic shape rising toward the exit surface 17. In this embodiment, a description will be given of the case where the light diffusion patterns 16 have an approximately triangular prismatic shape. Light entering the interior of the light guide 11 through the incident surface 18 and then incident on the light diffusion patterns 16 is diffused by the light diffusion patterns 16 provided in a row on the diffusing surface 15 and the diffused light then exits the light guide 11 through the exit surface 17 (see L2 in FIG. 6).

In the light guide 11, the intensity of light reflected toward the exit surface 17 by light diffusion pattern surfaces 162 of the light diffusion patterns 16 can be adjusted by varying among the light diffusion patterns 16 the pitch in the main scanning direction, the height, the width or so on. Therefore, by adjusting the pitch, height, width or so on of the light diffusion patterns 16 arranged at different portions in the main scanning direction, illuminating light exiting the different portions in the main scanning direction can be equalized.

Figure 7:
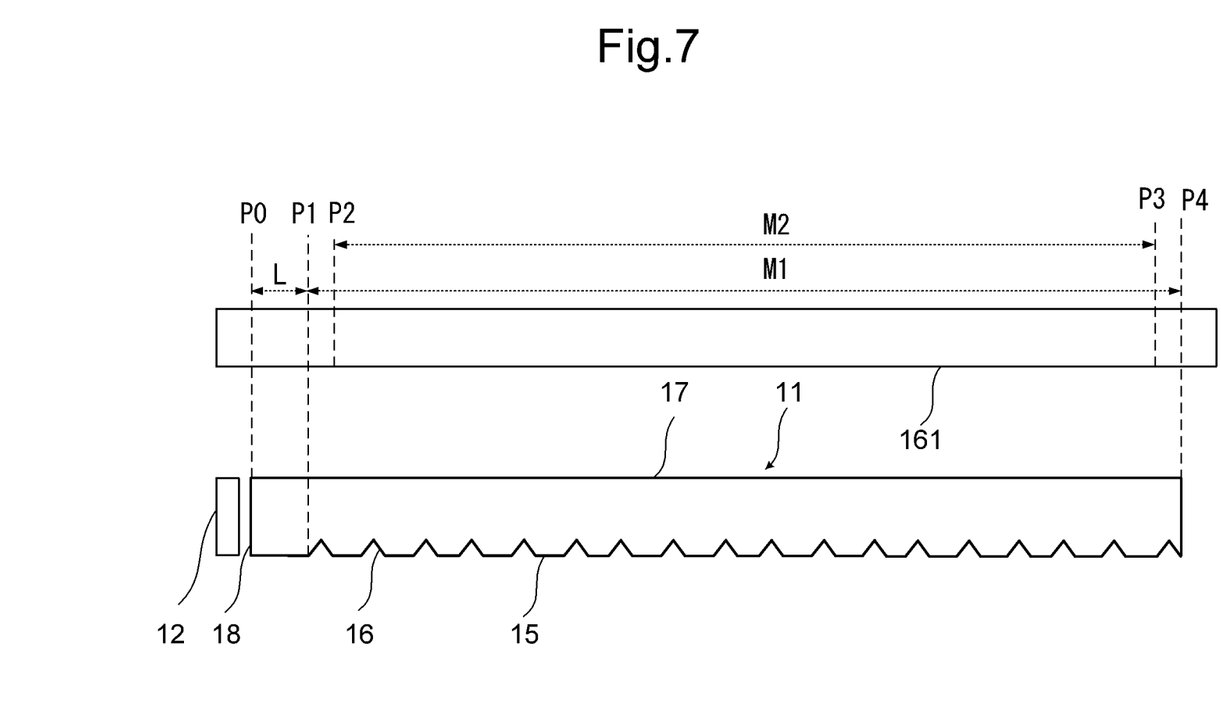
FIG. 7 is a view showing the relative positions of the light guide and an original glass plate in the one embodiment of the present disclosure.

FIG. 7 is a view showing the relative positions of the light guide 11 and the original glass plate 161. As described previously, the light diffusion patterns 16 are provided in a row from a position (P1 in FIG. 7) on the diffusing surface 15 a distance L from the incident surface 18 (P0 in FIG. 7) in the main scanning direction to the end (P4 in FIG. 7) of the diffusing surface 15 reaching the end surface of the light guide 11 opposite to the incident surface 18. In other words, the light diffusion patterns 16 are provided in a row on the diffusing surface 15 in a range represented by M1 in FIG. 7. As will hereinafter be described in detail, the aforementioned distance L satisfies the relation $L \geq D^{1/2} \times 8$ where D represents the diameter of the light guide 11. Since the light diffusion patterns 16 of prismatic shape are provided not from the position P0 of the incident surface 18 but from the position P1 the distance L from the incident surface 18, this can reduce differences in the illumination distribution of light exiting the light guide 11, as considered in the sub-scanning direction, among various portions of the light guide 11 in the main scanning direction.

The image reading range in the main scanning direction on the original glass plate 161 is set between two positions (P2 and P3 in FIG. 7) a predetermined distance inwardly from both the ends (P1 and P4 in FIG. 7) of the row of light diffusion patterns 16. In other words, the image reading range on the original glass plate 161 is a range represented by M2 in FIG. 7.

Figure 8:
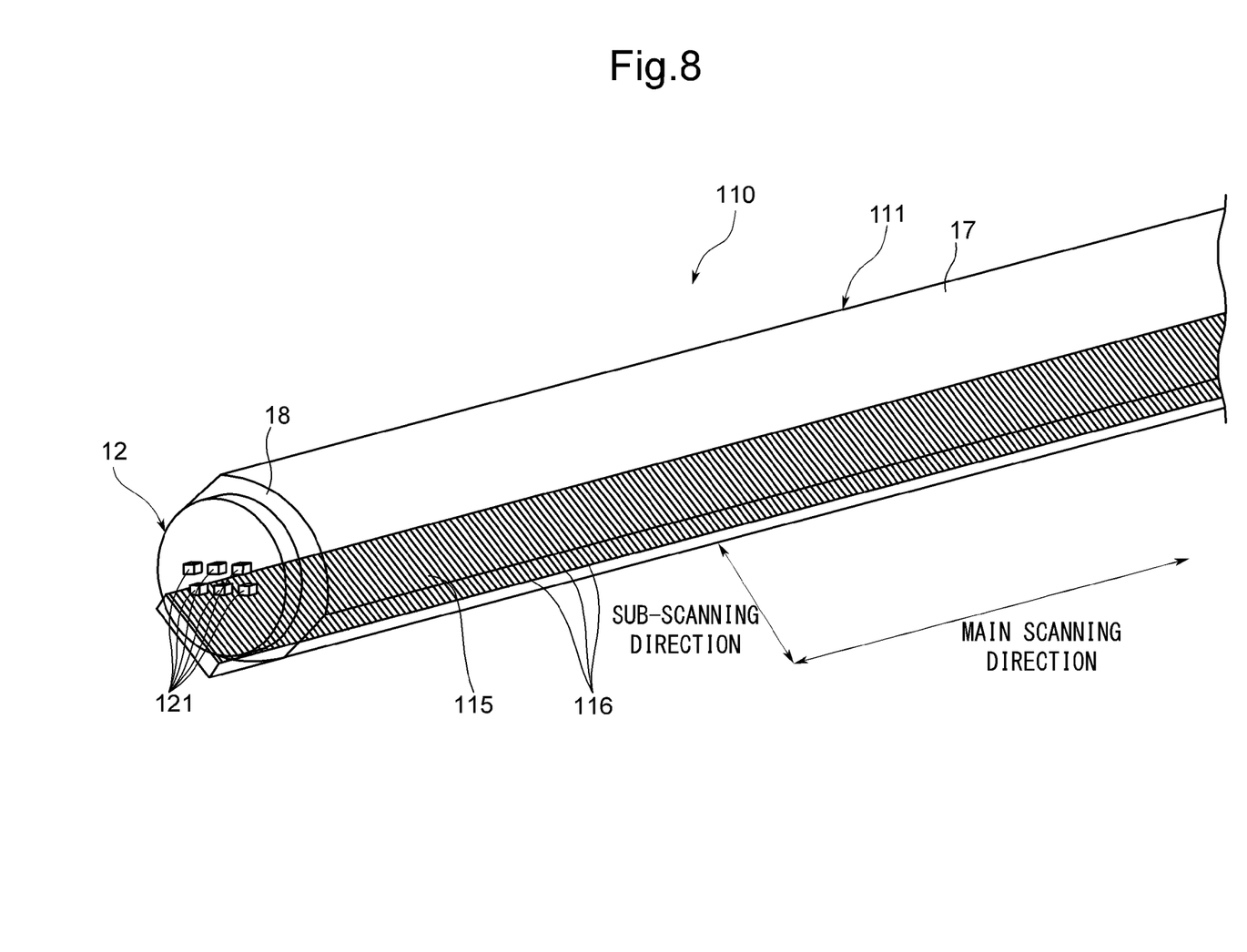
FIG. 8 is a perspective view showing an illumination device included in an image reading device of Comparative Example 1.

Next, the effects of the above image reading device 5 will be specifically described. FIG. 8 is a perspective view showing an illumination device included in an image reading device of Comparative Example 1. As shown in FIG. 8, the image reading device 110 of Comparative Example 1 is different from the above image reading device 5 in that a row of light diffusion patterns 116 of prismatic shape is provided immediately next to the incident surface 18 on a diffusing surface 115 of a light guide 111.

The light source 12 including LEDs 121 emits light toward the entire circumference of the light guide 111. Therefore, there are produced light incident on the light diffusion patterns 116 directly from the light source 12 (direct light) and light incident on the light diffusion patterns 116 following one or more total reflections on the outer peripheral surface of the light guide 111 (indirect light). The direct light and indirect light differ from each other in incident angles of light beams on the light diffusion patterns 116 and therefore also differ from each other in the angular distribution of exiting light beams as considered in the sub-scanning direction. The direct light is light directly incident on each light diffusion pattern 116 from the LEDs and, therefore, has shallow angles with respect to the light diffusion pattern 116, resulting in a narrow angular distribution, as considered in the sub-scanning direction, of exiting light beams through the exit surface. Unlike this, the indirect light is light incident on each light diffusion pattern 116 in all directions from the entire circumference of the light guide 111 by total reflection. In addition, the above prismatic shaped light diffusion patterns 116, as far as the light diffusion in the sub-scanning direction goes, allow incident light to be reflected thereon at the same angle as the incident angle of light beam and exit the light guide 111 at that angle, without any deflection component in the sub-scanning direction. Therefore, the direct light and indirect light are different from each other in the angular distribution of light beams in the sub-scanning direction after exiting the light guide 111, depending upon the incident angle with respect to the light diffusion pattern 116.

The quantity ratio between the direct light and indirect light differs among various portions of the interior of the light guide 111 in the main scanning direction. Particularly near the incident surface 18 in the interior of the light guide 111, the quantity of indirect light is significantly smaller than the quantity of direct light. In the image reading device 110 of Comparative Example 1, since the row of light diffusion patterns 116 of prismatic shape is provided immediately next to the incident surface 18 on the diffusing surface 115, illumination distribution in the sub-scanning direction significantly differs between the region of the interior of the light guide 111 near the incident surface 18 and the region of the interior of the light guide 111 away from the incident surface 18. In other words, light exiting the light guide 111 has different illumination distributions in the sub-scanning direction among various portions of the light guide 111 in the main scanning direction.

Therefore, if there arises a movement of the image reading position during image reading operation or an event in which the original document floats above the surface of the original glass plate 161, the image reading position is displaced in the sub-scanning direction. Thus, deviation from reference data determined by shading in the main scanning direction may not be kept constant throughout the entire region in the main scanning direction, so that an image obtained by reading the original document may have read density variations in the main scanning direction.

Figure 9:
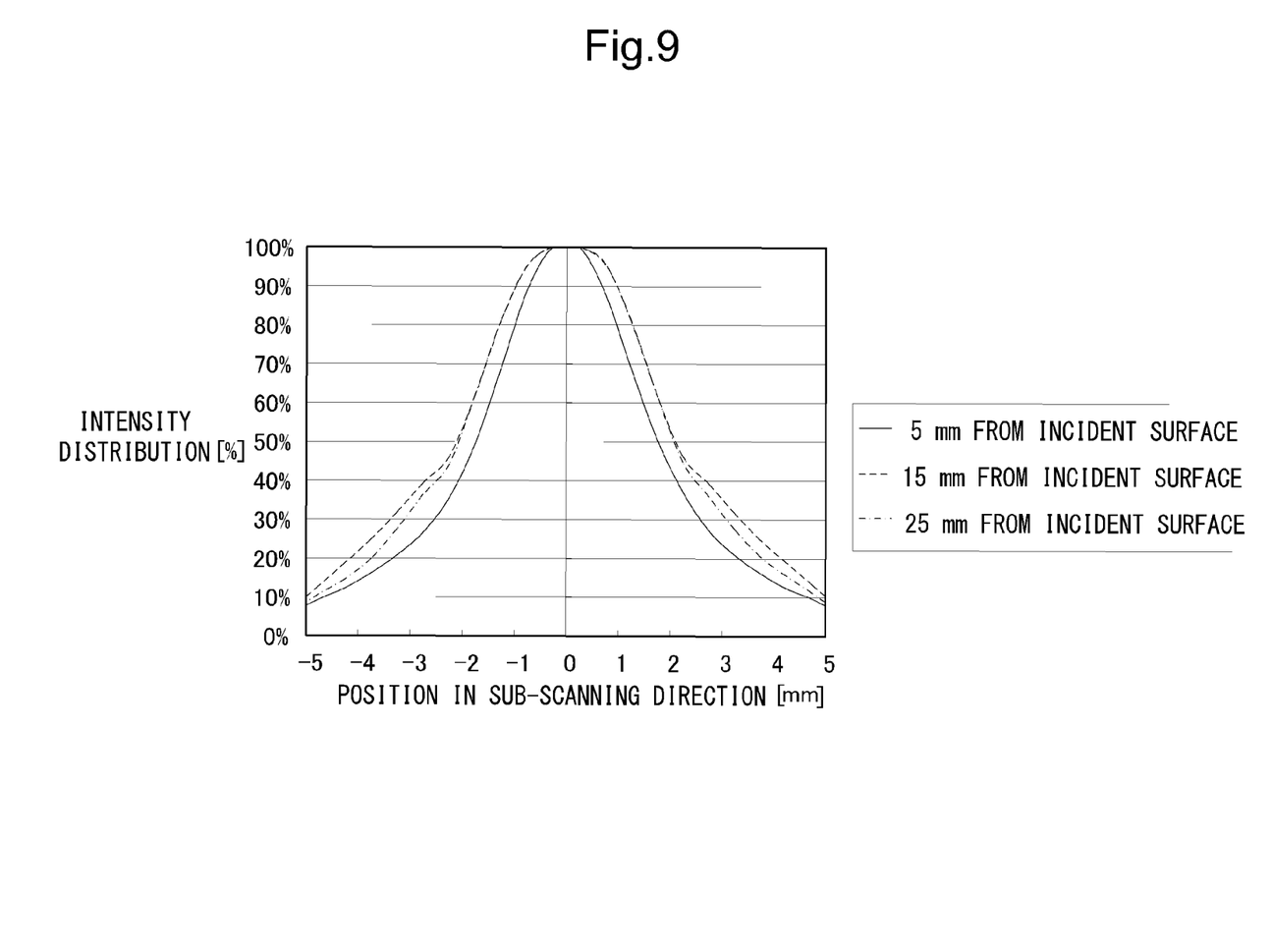
FIG. 9 is a graph showing reflected light diffusion distributions in the sub-scanning direction produced by a light guide in Comparative Example 1.

FIG. 9 is a graph showing reflected light diffusion distributions in the sub-scanning direction produced by the light guide 111 of Comparative Example 1. Specifically, the graph of FIG. 9 shows the illumination distributions in the sub-scanning direction at three different positions in the main scanning direction: a position 5 mm distant from the incident surface 18, a position 15 mm distant from the incident surface 18, and a position 25 mm distant from the incident surface 18. The illumination values shown in the graph of FIG. 9 are expressed as relative percentage intensity of light at each position in the sub-scanning direction, with 100% at a position of 0 mm in the sub-scanning direction. As shown in FIG. 9, the illumination distribution in the sub-scanning direction differs among the position 5 mm distant from the incident surface 18, the position 15 mm distant from the incident surface 18, and the position 25 mm distant from the incident surface 18. Particularly near the incident surface 18 in the interior of the light guide 111 (at the position 5 mm distant from the incident surface 18), the intensities of exiting light in the sub-scanning direction are small as compared with those at the other positions.

Figure 10:
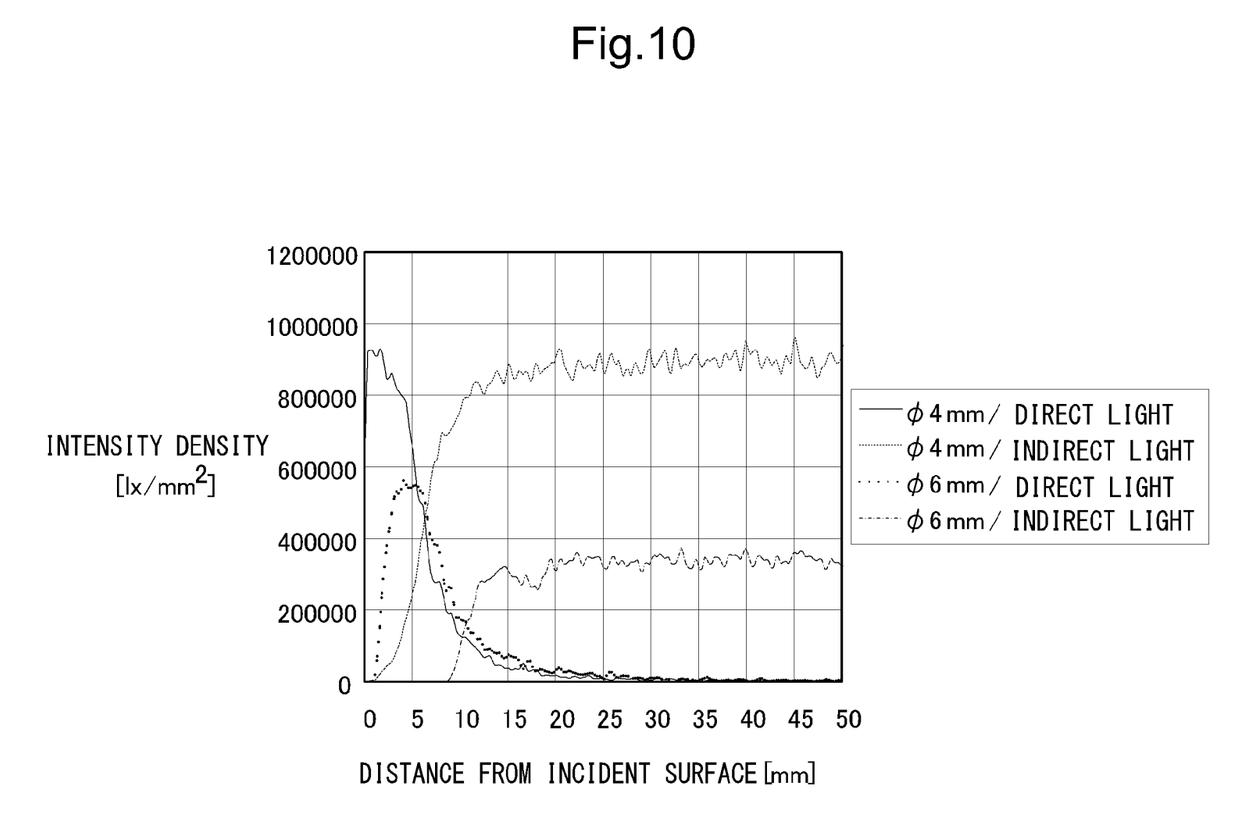
FIG. 10 is a graph showing intensity densities of direct light and indirect light when the diameter of the light guide in Comparative Example 1 is 4 mm and 6 mm.

The inventor conducted intensive studies in this relation and found that the quantity ratio between the direct light and indirect light in each portion of the interior of the light guide in the main scanning direction depends upon the diameter of the light guide. FIG. 10 is a graph showing intensity densities of direct light and indirect light when the diameter of the light guide 111 is 4 mm and 6 mm. As shown in FIG. 10, with a light guide 111 of 4 mm diameter, the intensity density of indirect light begins to be observed at 0.5 mm distance from the incident surface 18 and increases with distance from the incident surface 18. Then, the intensity density of indirect light appears little change at 19.5 mm and greater distances from the incident surface 18. On the other hand, with a light guide 111 of 6 mm diameter, the intensity density of indirect light begins to be observed at 8.0 mm distance from the incident surface 18 and increases with distance from the incident surface 18. Then, the intensity density of indirect light appears little change at 16.0 mm and greater distances from the incident surface 18. To sum it up, the rate of indirect light is substantially constant at $D^{1/2} \times 8$ and greater distances from the incident surface 18 where D represents the diameter of the light guide 111. This relation does not depend upon the area of the light-emitting surface of the light source 12.

In view of the above, in the image reading device 5 according to this embodiment, the row of prismatic shaped light diffusion patterns 16 is provided on the diffusing surface 15 not from immediately next to the incident surface 18 but from a $D^{1/2} \times 8$ or greater distance from the incident surface 18. Since the row of prismatic shaped light diffusion patterns 16 is provided from a position where the rate of indirect light is substantially constant, the illumination distribution of light exiting the light guide 11 as considered in the sub-scanning direction can be uniform among various portions of the light guide 11 in the main scanning direction. Thus, the amount of change of reflected light in the event of movement of the reading position during image reading operation or the occurrence of floating of the original document above the surface of the original glass plate 161 can be kept constant throughout the entire light guide 11 in the main scanning direction, which makes it less likely to cause the read image to have read density variations.

It is conceivable, in the configuration of Comparative Example 1, to reduce the probability of occurrence of read density variations of an image by providing the image reading range on the original glass plate at some distance from the incident surface 18 of the light guide 111. However, this is unfavorable in view of energy saving because light diffused by light diffusion patterns 116 near the incident surface 18 of the light guide 111 and exiting the light guide 111 through the exit surface 17 is wasted as not being used for image reading, so that the utilization efficiency of optical energy emitted from the light source 12 becomes low.

Unlike the above, in the image reading device 5 according to this embodiment, the row of prismatic shaped light diffusion patterns 16 is provided from a position where the rate of indirect light is substantially constant. Therefore, the image reading range on the original glass plate 161 can be provided in a range corresponding to the range within which the light diffusion patterns 16 are provided. Hence, light diffused by the light diffusion patterns 16 and exiting the light guide 11 through the exit surface 17 can be efficiently used for image reading and, thus, the utilization efficiency of optical energy emitted from the light source 12 is high.

Figure 11:
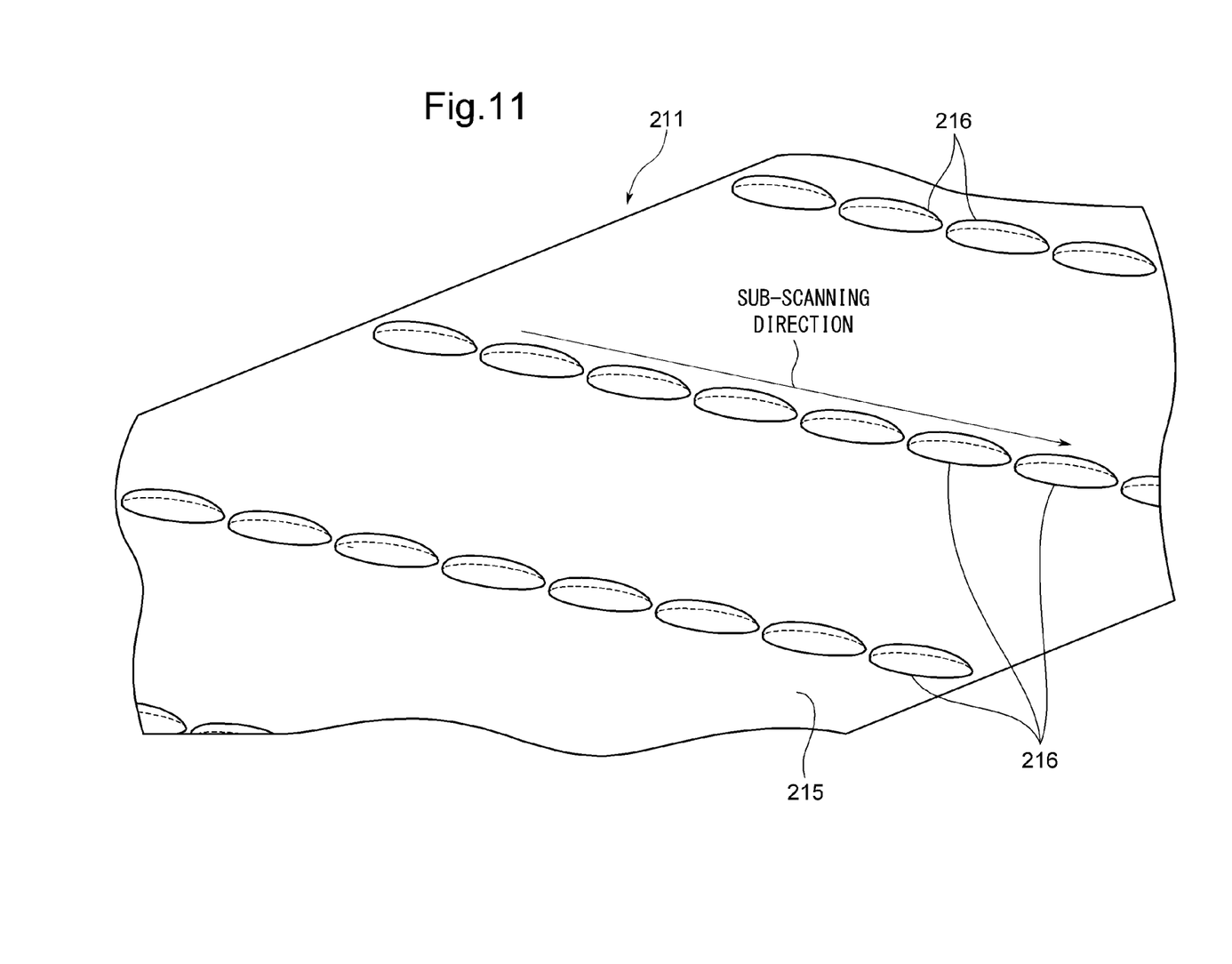
FIG. 11 is a perspective view showing the shape of light diffusion patterns provided in a row on a diffusing surface of a light guide in Comparative Example 2.

As in a light guide 211 of Comparative Example 2 shown in FIG. 11, if light diffusion patterns 216 provided on a diffusing surface 215 of the light guide 211 have an oval shape rising toward the exit surface of the light guide 211, direct light may be able to be diffused in the sub-scanning direction and differences in illumination distribution in the sub-scanning direction among different portions of the light guide 211 may be able to be reduced. However, in this case, the machining of a mold for making the light guide 211 becomes complicated, resulting in increased production costs for the light guide 211.

Unlike the above, in the light guide 11 according to this embodiment, the light diffusion patterns 16 provided on the diffusing surface 15 have a prismatic shape rising toward the exit surface 17. In the case of the light diffusion patterns 16 of prismatic shape, a mold for making the light guide 11 be easily machined, resulting in reduced production costs for the light guide 11.

The present disclosure is not limited to the above embodiment and can be modified in various ways.

Modification 1

Although in the above embodiment a structure has been described in which only one end surface of the light guide in the main scanning direction provides an incident surface and the light source emits light from one longitudinal end of the light guide, the present disclosure is not necessarily limited to this structure. For example, another structure may be employed in which both end surfaces of the light guide in the main scanning direction provide incident surfaces and light sources mounted on both the end surfaces emit light to the interior of the light guide.

Figure 12:
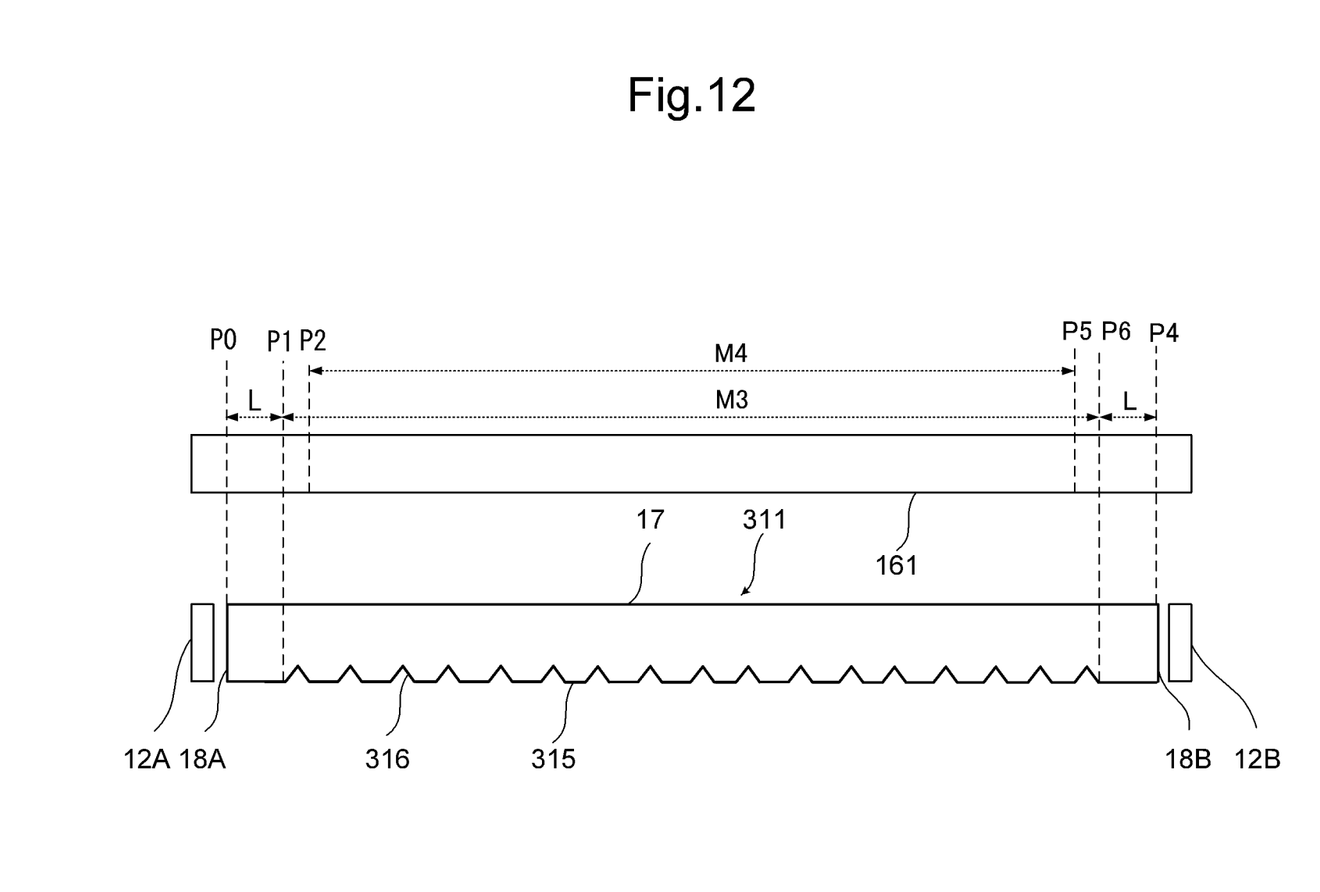
FIG. 12 is a view showing the relative positions of a light guide and an original glass plate in an image reading device of Modification 1.

FIG. 12 is a view showing the relative positions of a light guide 311 and an original glass plate 161 in an image reading device of Modification 1. As shown in FIG. 12, light sources 12A, 12B are mounted on both the end surfaces of the light guide 311. A row of light diffusion patterns 316 is provided from a position (P1 in FIG. 12) on a diffusing surface 315 a distance L from one incident surface 18A (P0 in FIG. 12) in the main scanning direction to a position (P6 in FIG. 12) thereon a distance L from the other incident surface 18B (P4 in FIG. 12) in the main scanning direction. In other words, the light diffusion patterns 316 are provided in a row on the diffusing surface 315 in a range represented by M3 in FIG. 12. The image reading range on the original glass plate 161 is set between two positions (P2 and P5 in FIG. 12) a predetermined distance inwardly from both the ends (P1 and P6 in FIG. 12) of the row of the light diffusion patterns 316. In other words, the image reading range on the original glass plate 161 is a range represented by M4 in FIG. 12.

Modification 2

Figure 13:
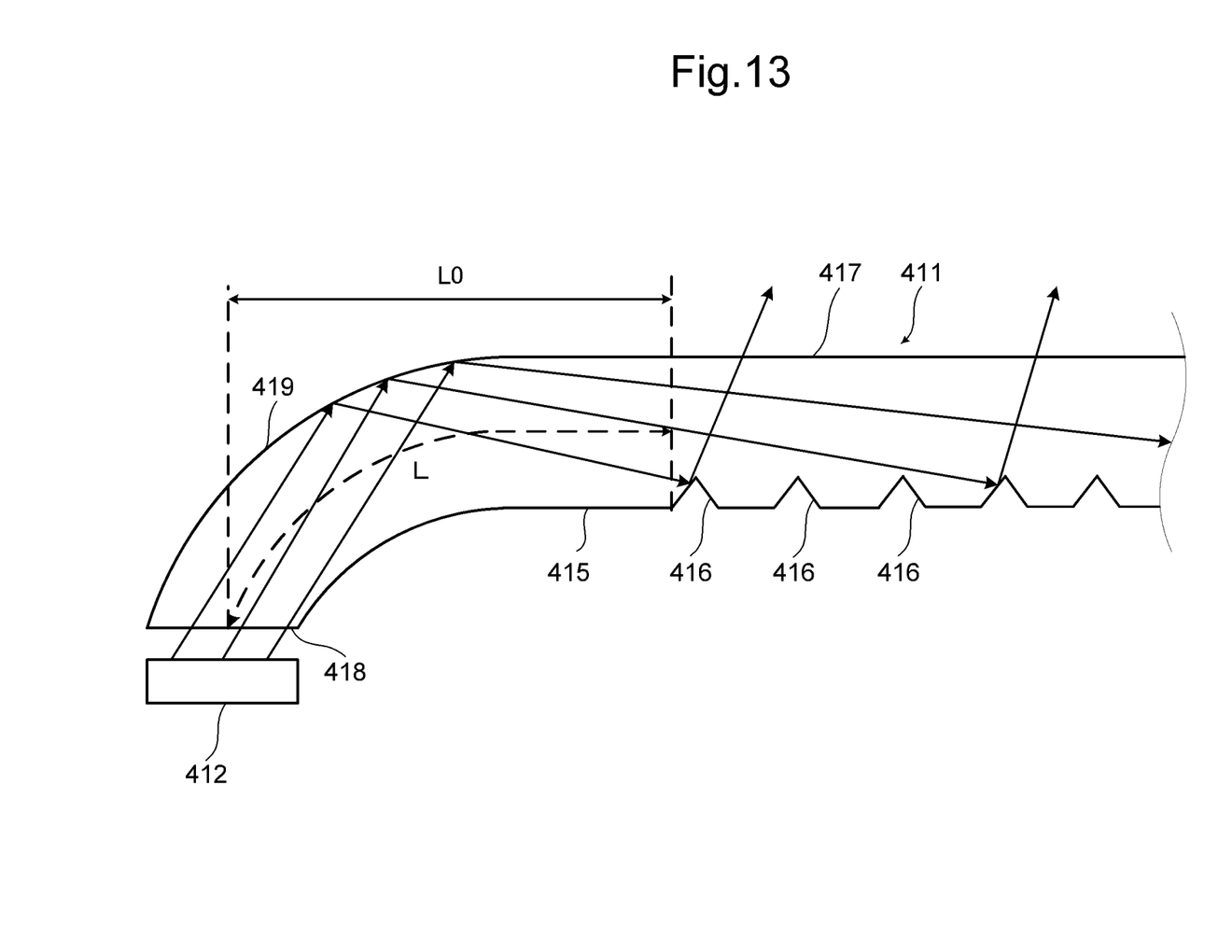
FIG. 13 is a side view showing a light guide included in an image reading device of Modification 2.

The light guide described in the above embodiment can have a U-shape. FIG. 13 is a side view showing a light guide 411 included in an image reading device of Modification 2. As shown in FIG. 13, the light guide 411 is provided at one end with an incident surface 418 through which light emitted from a light source 412 enters the light guide 411, and the one end thereof provided with the incident surface 418 is curved in a direction away from the exit surface 417 of the light guide 411. A curved reflective surface 419 is provided between the incident surface 418 and the exit surface 417. Light having entered the interior of the light guide 411 through the incident surface 418 is totally reflected at the reflective surface 419 and progresses into a middle region of the light guide 411. The light having progressed into the middle region of the light guide 411 is diffused by light diffusion patterns 416 provided on a diffusing surface 415 and exits the light guide 411 through the exit surface 417.

In this case, the row of light diffusion patterns 416 on the diffusing surface 415 is formed, like the above embodiment, from a distance L from the incident surface 418. Since the end of the light guide 411 provided with the incident surface 418 is curved in a direction away from the exit surface 417, the distance L0 from the incident surface 418 to the beginning of the row of light diffusion patterns 416 is smaller than that in the light guide 11 in the above embodiment. Therefore, the dimension of the light guide 411 in the main scanning direction can be reduced, resulting in size reduction of the image reading device.

Modification 3

Although the above embodiment includes LEDs 121 as the light source 12, the light source used in the present disclosure is not limited to LEDs and can include various types of light sources so long as they can emit light in the main scanning direction from the end surface of the light guide 11 toward the interior thereof.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An illumination device comprising:
    a light source; and
    a columnar light guide including an incident surface provided at least one of both longitudinal ends of the light guide and allowing light emitted from the light source to enter the light guide therethrough, a diffusing surface forming one side surface of the light guide extending in a direction of an optical axis of the light entering the light guide through the incident surface, the diffusing surface having a plurality of light diffusion patterns provided in a row to diffuse the light having entered the light guide through the incident surface, and an exit surface located opposite to the diffusing surface to extend in the direction of the optical axis and allowing the light diffused by the diffusing surface to exit the light guide therethrough, wherein the light diffusion patterns have a prismatic shape rising toward the exit surface and are provided in a row on the diffusing surface from $D^{1/2} \times 8$ or greater distance from the incident surface where D represents the diameter of the light guide.

2. The illumination device according to claim 1, wherein the longitudinal end of the light guide at which the incident surface is provided is curved in a direction away from the exit surface, a curved reflective surface is provided between the incident surface and the exit surface, and the light guide is configured so that light incident on the incident surface is totally reflected at the reflective surface to progress toward a middle region of the light guide.

3. The illumination device according to claim 1, wherein each of both end surfaces of the light guide located at both the longitudinal ends thereof is the incident surface.

4. An image reading device comprising an illumination device, an original glass plate, and a light-receiving element, wherein
    the illumination device comprises:
    a light source; and
    a columnar light guide including an incident surface provided at least one of both longitudinal ends of the light guide and allowing light emitted from the light source to enter the light guide therethrough, a diffusing surface forming one side surface of the light guide extending in a direction of an optical axis of the light entering the light guide through the incident surface, the diffusing surface having a plurality of light diffusion patterns provided in a row to diffuse the light having entered the light guide through the incident surface, and an exit surface located opposite to the diffusing surface to extend in the direction of the optical axis and allowing the light diffused by the diffusing surface to exit the light guide therethrough,
    the light diffusion patterns have a prismatic shape rising toward the exit surface and are provided in a row on the diffusing surface from $D^{1/2} \times 8$ or greater distance from the incident surface where D represents the diameter of the light guide, and
    the light-receiving element is configured to receive light reflected on an original document placed on the original glass plate by irradiating the original document with light having exited the light guide through the exit surface.

5. The image reading device according to claim 4, wherein an image reading range in a main scanning direction on the original glass plate is set between two positions a predetermined distance inwardly from both ends of the row of the light diffusion patterns.

* * * * *